United States Patent
Le Draoullec et al.

(10) Patent No.: US 6,912,453 B2
(45) Date of Patent: *Jun. 28, 2005

(54) DEVICE FOR MONITORING A PLURALITY OF SYSTEMS OF AN AIRCRAFT INCLUDING A DISPLAY DISPLAYING TASKS ALREADY PERFORMED

(75) Inventors: Christine Le Draoullec, Plaisance du Touch (FR); Philippe Mailhou, Leguevin (FR)

(73) Assignee: Airbus France, Toulouse Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/718,589

(22) Filed: Nov. 24, 2003

(65) Prior Publication Data

US 2004/0158370 A1 Aug. 12, 2004

Related U.S. Application Data

(63) Continuation of application No. 10/073,983, filed on Feb. 14, 2002, now Pat. No. 6,697,718.

(30) Foreign Application Priority Data

Feb. 26, 2001 (FR) .............................. 01 02570

(51) Int. Cl.[7] .......................... G06F 11/32; B64D 43/00
(52) U.S. Cl. ............................. 701/29; 701/3; 701/31; 701/35; 244/75 R; 244/194; 244/220; 340/945
(58) Field of Search ............................. 701/3, 29, 31, 701/35; 244/75 R, 194, 220; 340/945

(56) References Cited

U.S. PATENT DOCUMENTS

| | | | | |
|---|---|---|---|---|
| 4,635,030 A | * | 1/1987 | Rauch ........................ | 340/945 |
| 5,475,594 A | * | 12/1995 | Oder et al. ................... | 701/14 |
| 5,522,026 A | * | 5/1996 | Records et al. .............. | 345/710 |
| 5,838,261 A | * | 11/1998 | Lauta et al. ................. | 340/945 |
| 6,003,808 A | * | 12/1999 | Nguyen et al. .............. | 244/1 R |
| 6,038,498 A | * | 3/2000 | Briffe et al. ................... | 701/3 |
| 6,097,998 A | * | 8/2000 | Lancki ......................... | 701/33 |
| 6,122,575 A | * | 9/2000 | Schmidt et al. ............... | 701/29 |
| 6,246,341 B1 | * | 6/2001 | Germanetti .................. | 340/946 |
| 6,262,720 B1 | * | 7/2001 | Jeffrey et al. ................ | 345/710 |
| 2002/0120375 A1 | | 8/2002 | Draoullec et al. | |

FOREIGN PATENT DOCUMENTS

EP            974885 A1 * 1/2000 ........... G05B/23/02

OTHER PUBLICATIONS

Morgan, J et al., "MD–11 Aircraft Alerting Function", Scientific Honeyweller, Honeywell's Corporate. Minneapolis, US, 1993, pp. 60–65.*
Morgan et al., "MD–11 Electronic Instrument System", Proceedings of the Digital Avionics Systems Conference. Seattle, Oct. 5–8, 1992, New York, IEEE, US vol. conf. 11, pp 248–253, Oct. 5, 1992.*
Shaneyfelt, W, "The Helicopter Pilot's Emergency Situation Advisor", Scientific Honeyweller, Honeywell's Corporate. Minneapolis, US vol. 9, No. 1, pp 43–49, Jun. 21, 1988.*
Al Ditter, "An Epic in the Making," Commuter World, Dec. 1996–Jan. 1997, p. 16, 18–21.*
William B. Scott, "Pentium Powers 'Epic' Integrated Avionics," Aviation Week & Space Technology, Nov. 18, 1996, p. 67–69.*
James Holahan, "LCDs, Mice on the Flight Deck!," Aviation International News, Nov. 1, 1996, p. 56–58.*
Fred George, "Introducing Primus Epic," Business & COmmerical Aviation, Nov. 1996, p. 116, 118–120.*

* cited by examiner

*Primary Examiner*—Thomas G. Black
*Assistant Examiner*—Eric M. Gibson
(74) *Attorney, Agent, or Firm*—Oblon, Spivak, McClelland, Maier & Neustadt, P.C.

(57) ABSTRACT

A device for monitoring a plurality of systems of an aircraft including a monitoring unit configured to monitor the systems and to detect a failure of at least one of the systems, a display configured to display information output by the monitoring unit including at least one failure condition including a list of tasks to perform to address a detected failure including tasks already performed and tasks to be performed, and an input device configured to input information indicating that a task has been completed.

24 Claims, 5 Drawing Sheets

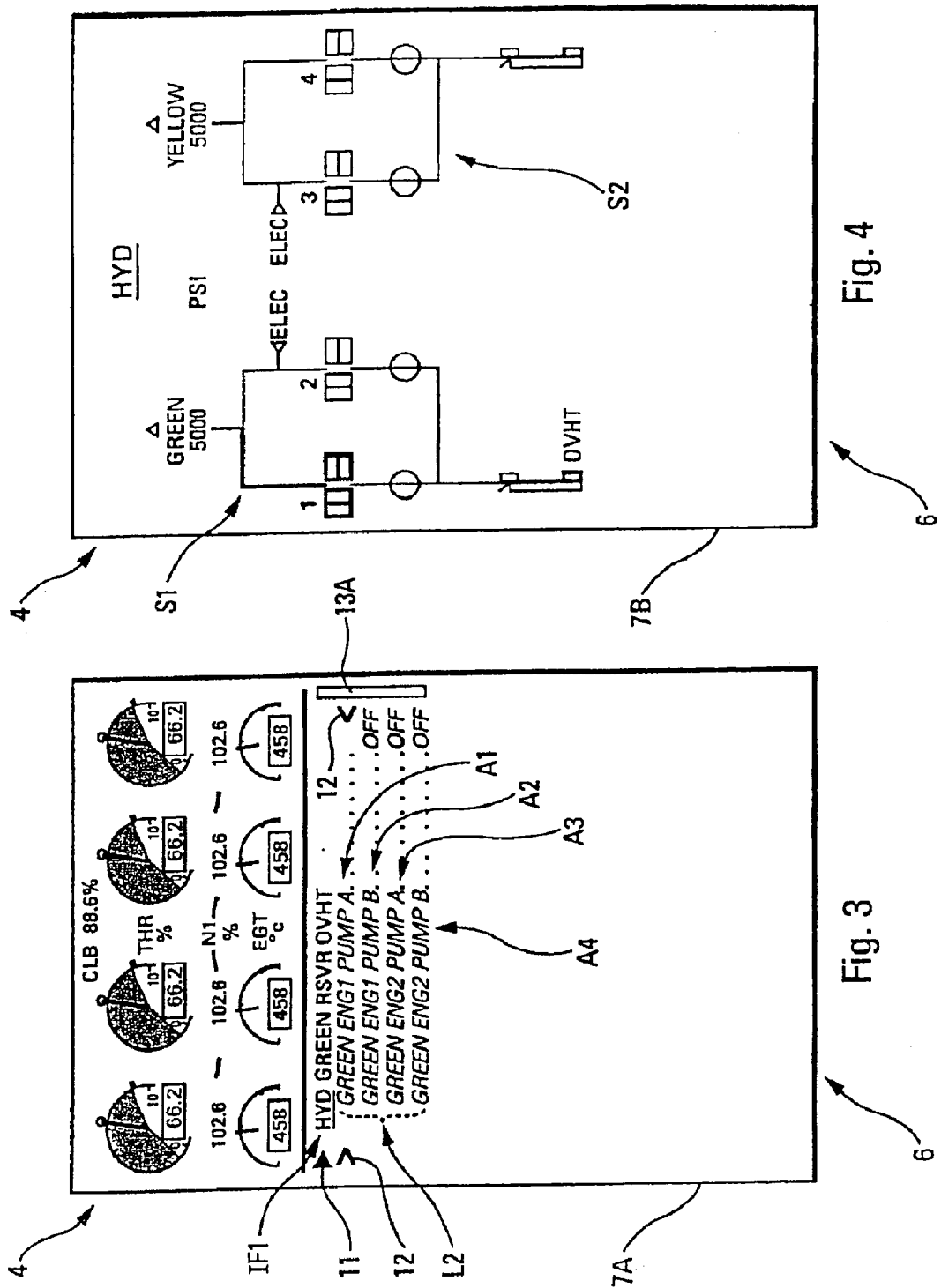

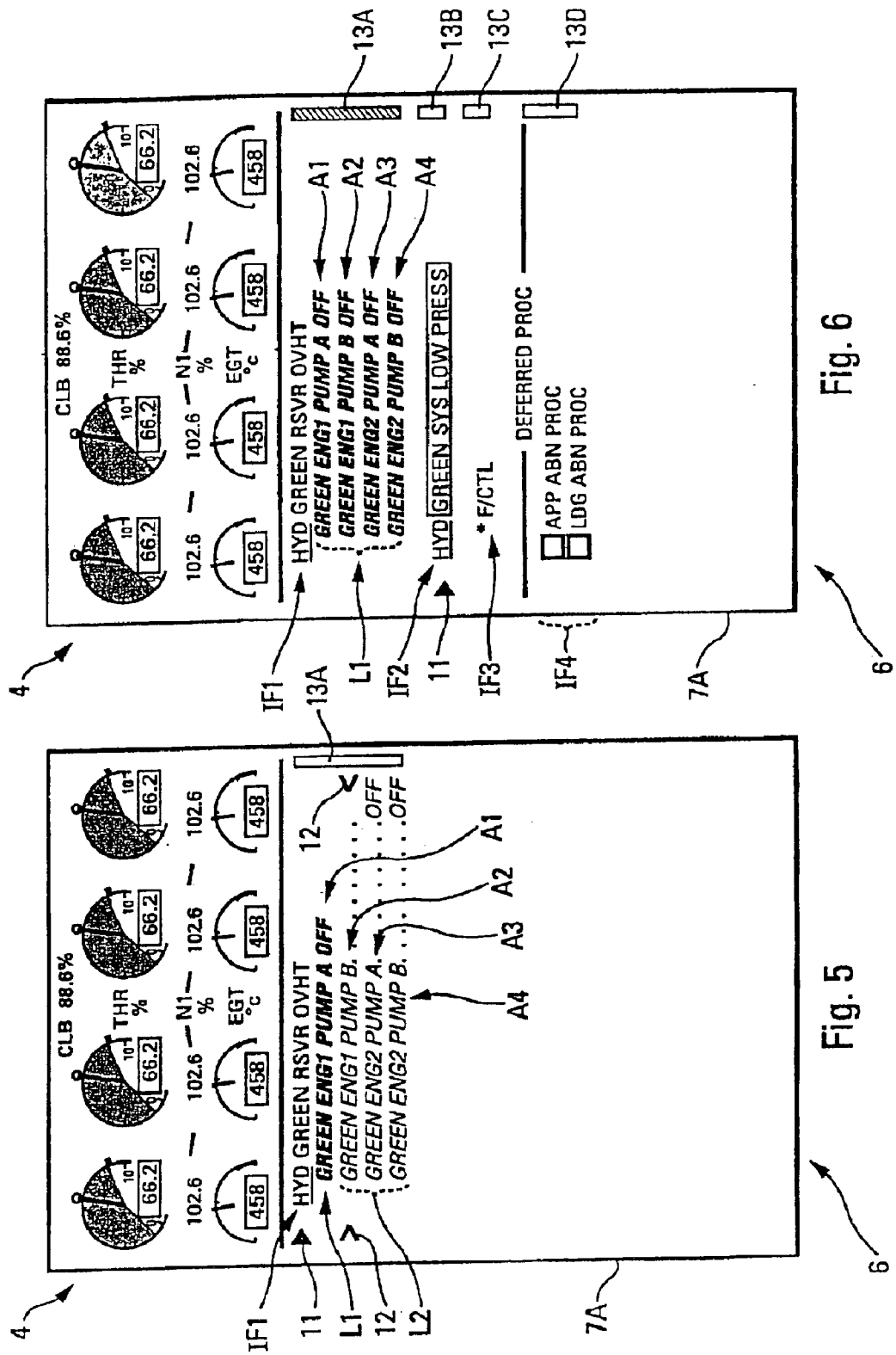

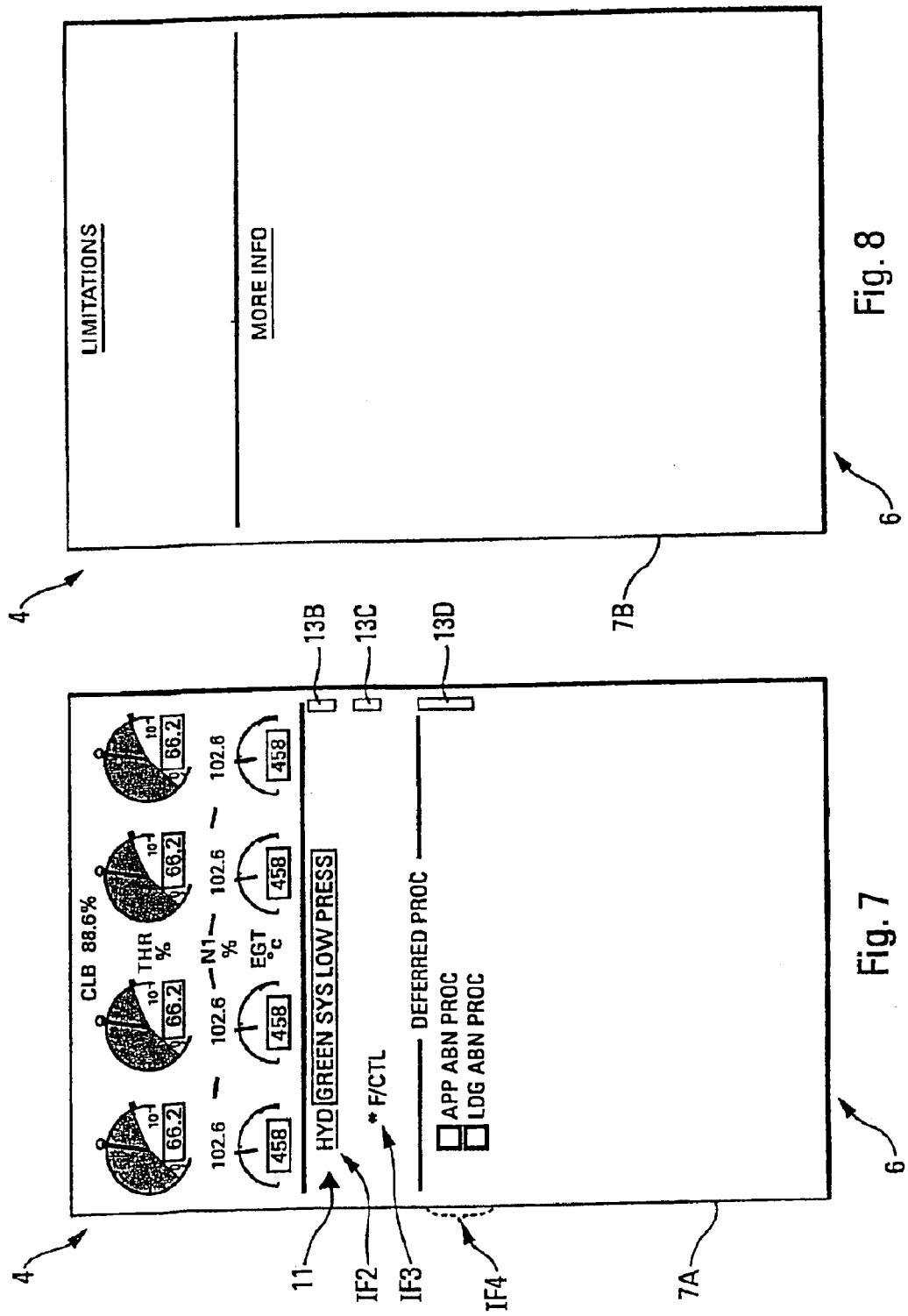

DEVICE FOR MONITORING A PLURALITY OF SYSTEMS OF AN AIRCRAFT INCLUDING A DISPLAY DISPLAYING TASKS ALREADY PERFORMED

CROSS-REFERENCE TO RELATED APPLICATIONS

This application is a continuation application of U.S. application Ser. No. 10/073,983 (now U.S. Pat. No. 6,697,718), filed on Feb. 14, 2002, which claims priority under 35 U.S.C. § 119 to French Patent Application 01 02570, filed on Feb. 26, 2001, the entire contents of both which are incorporated herein by reference.

BACKGROUND OF THE INVENTION

Field of the Invention

The present invention relates to a device for monitoring a plurality of systems of an aircraft, especially of a transport aircraft.

More particularly, although not exclusively, the monitoring device is a centralized device of the ECAM (Electronic Centralized Aircraft Monitoring) type which automatically monitors a plurality of systems (engines, control surfaces, etc.) of the aircraft and which informs the crew of the status of these systems.

It is known that such a monitoring device especially includes at least:

a monitoring device for monitoring the systems and for detecting any failure of one of the systems; and display means linked to the monitoring unit and capable of presenting, on at least one visual-display screen:

information relating to the monitoring of the systems; and upon detection of a failure of one of the systems, information relating to the failure, as well as to a corresponding failure-handling procedure including a list of actions having to be carried out by at least one operator.

In general, the display means present the following types of information, in particular:

block diagrams representing the various systems monitored;

information warning of a possible failure, especially when a particular parameter which is monitored approaches its limit values or exceeds them. In this case, in general, the display means display a page presenting this parameter which, moreover, is highlighted by flashing, to draw the attention of the crew;

messages relating to particular functions (for example, the de-icing of the engines) which can be activated temporarily and which are activated in this instance. These messages are, needless to say, displayed only at the time when the corresponding functions are still activated; and regulatory information, such as the thrust of the engines, the quantity of fuel remaining or the aerodynamic configuration, which for their part are displayed permanently.

Moreover, when a failure of a system is detected by such a monitoring device, the device:

alerts the crew by audible and/or visual means;

identifies the failure and displays the block diagram corresponding to the failed system, on the visual-display screen. All the displays indicated below are formed on the visual-display screen;

checks whether the failure is isolated or whether other systems are affected by this failure and, if appropriate, displays the list of the systems which are also affected;

displays the corresponding failure-handling procedure, including a plurality of particular actions which have to be carried out by an operator or the crew of the aircraft, to isolate the failure and deal with it so as to be able to carry on with the flight;

manages the failure-handling procedure as and when the operator or the crew carry out the various actions, deleting an action from the visual-display screen automatically as soon as it detects that this action has been carried out; and when the failure has been dealt with, displays an operational status report for the aircraft, particularly including the limitations to be complied with (maximum speed, maximum altitude, etc.) for the remainder of the flight, the systems and/or the functions which are inoperative, etc.

Such a monitoring device exhibits a few drawbacks. In particular, when carrying out a fault-handling procedure which is presented and managed by the monitoring device:

when an action has been carried out, it automatically disappears from the visual-display screen. Consequently, among the operators of the aircraft (pilot, co-pilot), the operator who is not occupied with the failure-handling procedure (and sometimes even the operator who is occupied with it), does not always know what action or actions has or have been carried out and deleted, and therefore has trouble in evaluating the actual progress of the failure-handling procedure; and, moreover since, in the usual way, the carrying out of certain actions is not detected automatically, that is to say cannot be detected by monitoring device, such an action (the carrying-out of which cannot be detected) still remains displayed on the visual-display screen, even if it has actually been carried out. In this case, the operator or the crew has to memorize all the actions (which are not detected automatically) which he has actually carried out, which requires sustained attention on his part.

SUMMARY OF THE INVENTION

The present invention relates to a monitoring device of the type described above, which makes it possible to remedy the above-mentioned drawbacks.

To that end, according to the invention, the monitoring device of the type including at least:

a monitoring unit for monitoring the systems and for detecting any failure of one of the systems; and display means linked to the monitoring unit and capable of presenting, on at least one visual-display screen, information relating to the monitoring of the systems, and, upon detection of a failure of one of the systems, information relating to the failure, as well as at least one corresponding failure-handling procedure including at least a list of actions having to be carried out by at least one operator;

is noteworthy in that the display means, upon detection of a failure and at least throughout the corresponding failure-handling procedure, display, on the visual-display screen, at least:

information identifying the failure-handling procedure;

if appropriate, a list of the actions already carried out relating to the failure-handling procedure; and if appropriate, a list of the actions still having to be carried out relating to the failure-handling procedure, highlighting the next action having to be carried out;

and in that the monitoring device further includes an information means capable of being actuated by the operator and allowing the latter to inform the monitoring device, if appropriate, of the carrying-out of at least one particular action relating to the failure-handling procedure.

Thus, by virtue of the invention, the various operators (pilot, co-pilot, etc.) continuously and precisely know the actions already carried out and those still having to be carried out, and thus the state of progress of the failure-handling procedure, without having to memorize these actions, which, needless to say, increases the comfort of the operators in the carrying out of these actions, allows them to focus their attention and their memory on other information, and avoids unnecessary actions and/or checks.

Moreover, the information which is presented by the display means precisely illustrates the actual state of progress of the failure-handling procedure, since, by virtue of the information means, the operator can inform the monitoring device of the carrying-out of a particular action (of the above-mentioned undetectable type) which the latter would not have been able to detect automatically. The monitoring device thus knows precisely which are the actions which have been carried out, either because it has actually detected them being carried out, or because the operator has informed it that these actions have been carried out.

According to the invention, the display means, while a plurality of failure-handling procedures exist, display all the procedures on the visual-display screen in an order of priority, and the monitoring device further includes a means for indicating, on the visual-display screen, the procedure to be dealt with, that is to say which has to be dealt with in priority from among all the procedures displayed. This makes it possible, in a stressful situation, to guide the pilot in carrying out the procedures. This is particularly advantageous by comparison with certain usual devices which present the list of the various procedures to be performed and ask the pilot to choose which one he will deal with first.

Furthermore, advantageously, the display means present, on the visual-display screen, when a failure-handling procedure is terminated, at least one characteristic sign signaling the completion of this failure-handling procedure, and the monitoring device further includes a deletion means capable of being actuated by the operator and allowing the latter to delete from the visual-display screen all the information relating to a failure-handling procedure.

Moreover, advantageously, the display means continuously present on the visual-display screen the new limitations to be complied with by reason of a failure, as soon as these new limitations are known. Thus, despite the alterations which might have been generated by the failure, the crew is kept permanently informed of the limitations to be complied with for the remainder of the flight, which is a guarantee of safety.

It is known that certain failure-handling procedures include conditional stages, that is to say that the action or actions to be carried out at such a (conditional) stage depend on at least one particular condition (for example "if condition X is satisfied, then carry out action A, otherwise carry out action B"). To that end, it is necessary to know whether a particular condition is or is not satisfied, or which condition among several is satisfied. However, the monitoring device is not always in a position to identify the actual condition automatically. In such a situation, with the usual monitoring devices, it is up to the operator to determine the actions to be carried out and those to be ignored.

According to the invention, the monitoring device further includes a selection means capable of being actuated by the operator and allowing the latter, in a conditional failure-handling procedure including a plurality of conditions, to select one of the conditions, and the display means present, on the visual-display screen, the various possible conditions and highlight the actions to be carried out for a particular condition, on the visual-display screen, after the selection of this condition by the selection means. Consequently, it is sufficient for the operator to select the appropriate condition and the display means present him with the actions having to be carried out for the condition thus selected. The function of help with the handling of the failure is thus enhanced by the present invention.

Moreover, the monitoring device advantageously includes a cancellation means capable of being actuated by the operator and allowing the latter, if appropriate, to cancel the previous selection of a condition in a conditional failure-handling procedure.

Moreover, advantageously, the monitoring device further includes a deletion means capable of being actuated by the operator and allowing the latter to delete information presented on the visual-display screen, and the display means highlight, on the visual-display screen, among the information which is presented there, the information which is capable of being deleted by the deletion means. Thus, the operator knows exactly the information which he can delete with the aid of the deletion means. This makes it possible to prevent him accidentally deleting information which may be useful for the remainder of the flight.

Furthermore, advantageously, the monitoring device in accordance with the invention further includes an information means capable of being actuated by the operator and allowing the latter to inform the monitoring device of the occurrence of a failure, and an interrogation means capable of being actuated by the operator and allowing the latter to ask the monitoring device to have the display means present, on the visual-display screen, the failure-handling procedure relating to the failure. This makes it possible to take into account failures or incidents which cannot be detected by the monitoring device, but which can be detected by an operator, such as the presence of a cracked windscreen, for example.

In one particular embodiment, the monitoring device in accordance with the invention further includes an interrogation means capable of being actuated by the operator and allowing the latter to request supplementary information relating to a failure, and the display means present, on the visual-display screen, supplementary information relating to a failure, in response to an actuation of the interrogation means by the operator.

Furthermore, advantageously, the display means present, on the visual-display screen, for a failure-handling procedure, if appropriate, deferred actions corresponding to actions having to be carried out subsequently, and the monitoring device further includes a validation means capable of being actuated by the operator and allowing the latter to validate these deferred actions so as to carry them out (immediately) upon the validation.

In one particular embodiment, the monitoring device in accordance with the invention further includes a database including lists of operations to be verified ("check lists") and means, automatic or manual, making it possible to control the display means so that they present, on the visual-display screen, at least one of the lists. These are lists of operations to be verified, which are generally drawn up on the basis of recommendations made by the constructor of the airplane, and which are adapted to the specific wishes of the airlines. These lists of operations to be verified are usually found on a paper medium, and their presentation in accordance with the invention on the visual-display screen makes it possible to facilitate reading them and making use of them.

The monitoring device in accordance with the invention preferably further includes means for automatically correcting these lists of operations to be verified, upon a failure, so as to take into account effects generated by this failure on the lists.

Furthermore, for reasons of safety, the monitoring device further includes a validation means capable of being actuated by the operator and allowing the latter to validate information which he has supplied to the monitoring device.

Advantageously, moreover, the monitoring device further includes:

a recall means capable of being actuated by the operator and allowing the latter:

by a first actuation, to recall to the visual-display screen, if appropriate, the last procedure deleted; and by a second actuation, to recall to the visual-display screen, if appropriate, all the procedures deleted since the start of the flight of the aircraft; and/or a recall means capable of being actuated by the operator and allowing the latter to recall to the visual-display screen, if appropriate, all the deferred actions which have been deleted and which have not yet been carried out.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3 to 8 diagrammatically show the different presentations of information on a visual-display screen of a monitoring device in accordance with the invention, making it possible to give a good explanation of the characteristics and the advantages thereof.

DESCRIPTION OF THE PREFERRED EMBODIMENTS

FIGS. 2 to 8 include indications such as they may appear in reality on a monitoring device of an airliner. That is why these indications appear in the form of words in English or of abbreviations originating from English, as used in reality and with which the person skilled and the art is more familiar than with indications in French. These words or these abbreviations are well known and understood by the users (pilot, etc.) and the manufacturers of monitoring devices for airliners, which is why they have not been transcribed into French in the following description unless such a presentation proves to be useful or necessary to explain the particular features of the present invention.

Figure 1:
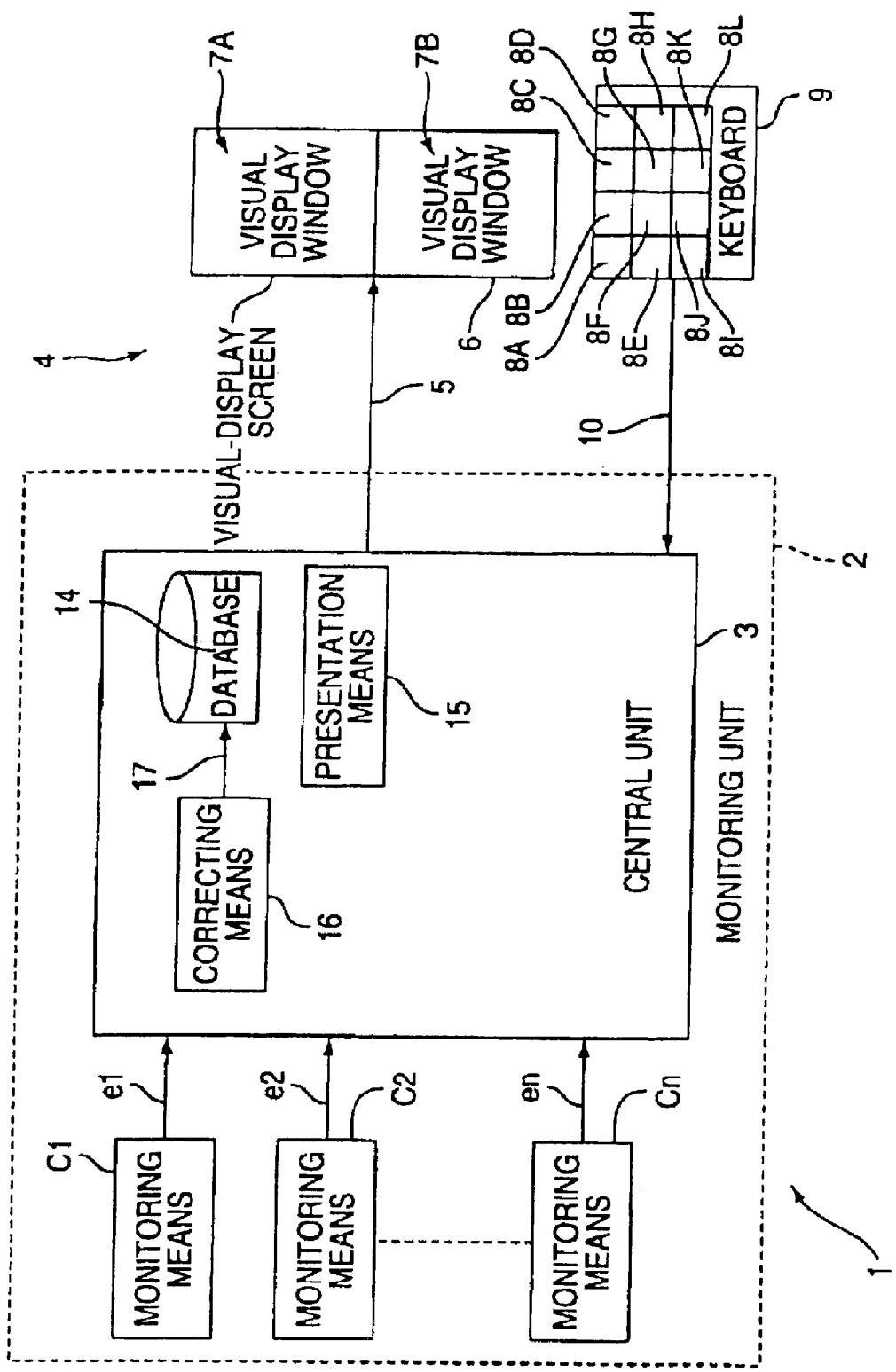
FIG. 1 is the block diagram of a monitoring device in accordance with the invention.

The monitoring device 1 in accordance with the invention and represented diagrammatically in FIG. 1 is intended for the monitoring of a plurality of systems, such as the engines, the control surfaces and/or the lighting of an aircraft, in particular a civil transport airplane. This monitoring device 1 which is, preferably, a centralized device of the ECAM (Electronic Centralized Aircraft Monitoring) type, informs the crew of the aircraft of the status of these systems.

Such a monitoring device 1 comprises, in a known way:

a monitoring unit 2 which comprises:

a plurality of sensors or of monitoring means C1 to Cn which monitor the operation of the various systems, especially by measuring particular parameters, such as the thrust of the engines, for example. These monitoring means C1 to Cn can especially be integrated into the systems; and a central unit 3 which includes a computer, which is linked by links e1 to en, respectively to the monitoring means C1 to Cn, and which manages or handles the information received from the monitoring means C1 to Cn, the monitoring unit 2 being capable of detecting a failure of one of the systems, either directly by a monitoring means C1 to Cn, or from processing carried out by the central unit 3; and display means 4 of the usual type, which are linked to the central unit 3 by a link 5 and which are capable of presenting, on at least one visual-display screen 6:

information relating to the monitoring of the systems; and upon detection of a failure of one of the systems, information relating to the failure, as well as to a corresponding failure-handling procedure including a list of actions having to be carried out by at least one operator.

The visual-display screen 6 may include several visual-display windows 7A, 7B. It preferably includes two superimposed windows 7A and 7B.

Figure 2:
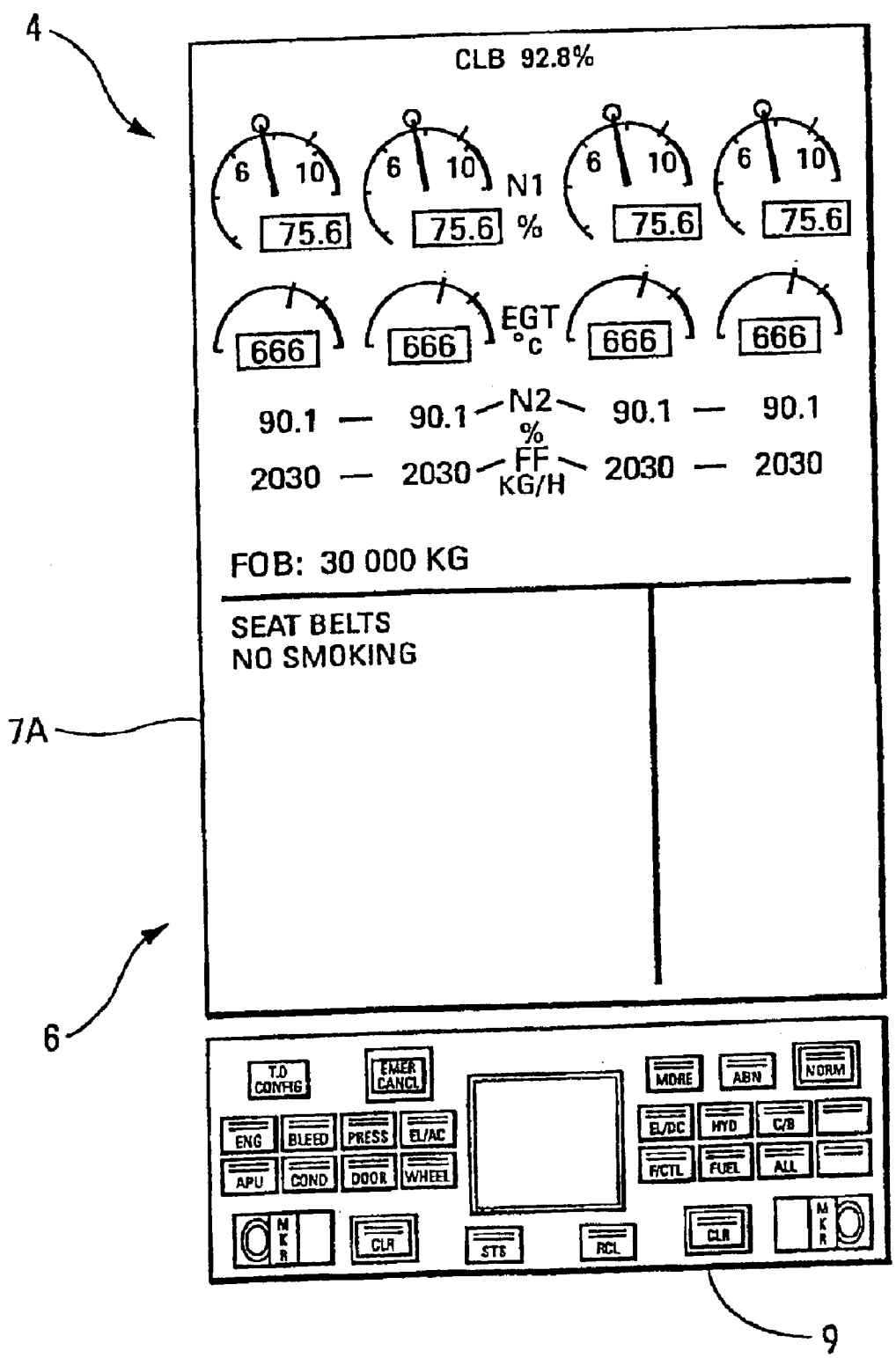
FIG. 2 diagrammatically shows an exemplary embodiment of a monitoring device in accordance with the invention.

In FIG. 2, in a window 7A have been represented types of information likely to be presented by the display means 4 to the crew, in the absence of a failure of the various systems which are monitored.

In this instance, what is involved is, by illustration:

regulatory information which is permanently displayed, such as:

the rate of climb, CLB;

the rotational speed N1 of the low-pressure module of the engines;

the exit temperature of the gases from the engines, EGT (Exhaust Gas Temperature);

the rotational speed N2 of the high-pressure module of the engines;

the flow of fuel, FF (Fuel Flow), the parameters N1, EGT, N2 and FF being presented for each of the four engines of the aircraft; and the mass of fuel remaining, FOB (Fuel On Board); and messages giving information on the existence of particular functions which are activated temporarily, such as indicator lamps asking the passengers to fasten their seatbelts (SEAT BELTS) and not to smoke (NO SMOKING).

Furthermore, when a failure of a system is detected, the monitoring system 1 normally carries out the following operations:

it alerts the crew via audible and/or visual means, not represented;

it identifies the failure;

it checks whether the failure is isolated or whether other systems are affected by this failure and, if appropriate, displays the list of the systems which are also affected;

it displays the corresponding failure-handling procedure, including a plurality of particular actions, which have to be carried out by an operator (pilot, co-pilot, etc.) or the crew of the aircraft, to isolate the failure and to deal with it so as to be able to carry on with the flight;

it manages the failure-handling procedure as and when the operator or the crew carry out the various actions, as detailed below; and when the failure has been dealt with, it displays an operational status report on the airplane especially including the limitations to be complied with (maximum speed, maximum altitude, etc.) for the remainder of the flight, the systems and/or the functions which are inoperative, etc.

To do this, according to the invention:

the display means 4, upon the detection of a failure and at least throughout the corresponding failure-handling procedure, present, on the visual-display screen 6, as can be seen in FIGS. 3, 5 and 6 showing the window 7A, at least:

information IF1 identifying the failure-handling procedure;

if appropriate, a list L1 of the actions already carried out relating to the failure-handling procedure; and if appropriate, a list L2 of the actions still having to be carried out relating to the failure-handling procedure, highlighting the next actions having to be carried out; and the monitoring device 1 further includes an information means 8A capable of being actuated by an operator (pilot, co-pilot, etc.) and allowing the latter to inform the monitoring unit 1, if appropriate, that at least one particular action relating to the failure-handling procedure has been carried out.

Thus, by virtue of the invention, the various operators (pilot, co-pilot, etc.) continuously and precisely know the actions already carried out (list L1) and those still having to be carried out (list L2), and thus the state of progress of the failure-handling procedure, without having to memorize these actions, which, needless to say, increases the comfort of the operators in the performance of these actions, allows them to focus their attention and their memory on other information, and avoid unnecessary actions and/or checks.

Moreover, the information which is presented by the display means 4 precisely illustrates the actual state of progress of the failure-handling procedure, since, by virtue of the information means 8A, the operator can inform the monitoring device 1, as appropriate, of the carrying out of all the actions (of the "undetectable" type) which the latter would not have been able to detect automatically. The monitoring device 1 thus knows precisely which are the actions which have been carried out, either because it has actually detected them being carried out (the monitoring unit 3 can usually detect the effects generated by the majority of the actions capable of being carried out by an operator), or because the operator has informed it that these actions have been carried out.

The information means 8A corresponds to an actuating element such as a key, a push button or a thumb wheel, for example, a keyboard 9 which is at the disposal of the operator and which is linked by a link 10 to the central unit 3. This keyboard 9 includes other actuating elements 8B to 8L which also can be actuated by the operator and which will be specified below.

In FIG. 2 has been represented a preferred, but not exclusive, example of a keyboard 9 including a plurality of actuating elements, some of which will be detailed below.

The information IF1 identifying the failure-handling procedure being carried out (or to be carried out) is indicated and highlighted by an appropriate means 11, for example a cursor of triangular shape, which is placed at the same level as this procedure information IF1. Needless to say, other means of highlighting could be provided in supplement or in a variant thereof, such as a change of color or of brightness or an alteration to the graphics, for example. According to the invention, when there are a plurality of procedures in existence, the means 11 identifies the procedure which has to be followed as a priority, as represented in FIG. 6, for example.

At the same time as they display the above-mentioned information on the window 7A relating to the failure-handling procedure, as represented in FIG. 3, the display means 4, upon detection of a failure, can present the block diagrams S1 and S2 of the systems which have failed, in the window 7B, as shown in FIG. 4.

FIGS. 3, 5, 6 and 7 illustrate various stages of the same failure-handling method. Thus:

at the stage of FIG. 3, the failure of a system (in this instance, by illustration, the overheating (OVHT) of the hydraulic circuit) has just been detected and the failure-handling procedure IF1, as well as the list L2 of the actions A1 to A4 then having to be carried out, are displayed. These actions are, in the present example, the shutting-off of the pumps A and B of the engines 1 and 2. With no action yet having been carried out, the list L1 does not contain any element and it is therefore not displayed. Moreover, the next action A1 to be carried out ("GREEN ENG1 PUMP A", that is to say the shutting-off of the pump A of the engine 1) is highlighted by a double-arrow cursor 12. Other normal means for highlighting are possible, needless to say;

at the stage of FIG. 5, the first action A1 has been carried out. The carrying-out of this action A1 makes it possible to create the list L1. Moreover, in the window 7B of the visual-display screen 6 simultaneously displaying the block diagrams S1 and S2, the shutting-down of the pump A is highlighted, in particular by a change of color and/or of thickness of the lines of the block diagrams, as can be seen in the case of block diagram S1 in FIG. 4. In FIGS. 3, 5 and 6, lists L1 and L2 exhibit different line thicknesses. It is possible, needless to say, to use other known means (color difference, especially) to differentiate these lists L1 and L2. The cursor 12 is moved automatically on to the following action A2 to be carried out. The above-mentioned operations are repeated for all the actions A1 to A4;

at the stage of FIG. 6, all the actions A1 to A4 of the failure-handling procedure IF1 have been carried out. List L2 has therefore disappeared. The display means 4 furthermore present an indicator 13A and, in this instance a solid (vertical) bar which is provided beside the information IF1 and L1, which informs the operator of the conclusion (that is to say of the complete performance) of the failure-handling procedure IF1. This indicator 13A also indicates to the operator that all the information (namely the procedure IF1 and the list L1) which was placed at its level can be deleted by the operator, by the actuation of a particular deletion means 8B. This deletion means 8B may, for example, include the "CLR" key of FIG. 2. As can be seen, other indicators of this type 13B, 13C and 13D (vertical bar) are arranged beside other information IF2, IF3 and IF4. These indicators 13A, 13B, 13C and 13D inform the operator that he can successively delete each group of corresponding information by starting from the top (IF1 and L1, then IF2, then IF3, then IF4), by successive actuation of the deletion means 8B. Thus, the operator is perfectly aware of the information which he can delete with the aid of the deletion means 8B. This makes it possible to prevent him accidentally deleting information which may be useful for the remainder of the flight. Among the indicators 13A to 13D, only the indicator 13A is solid, since only the corresponding information or operation (IF1 and L1) has been carried out. It will be noted that the information IF2 is failure information (absence of pressure), a failure which is generated by the carrying-out of actions A1 to A4 (shutting-off of the pumps), and information IF3 makes it possible to indicate the elements (F/CTL": "Flight Control", namely the piloting control surfaces) which are affected by this failure. As for the information IF4, this relates to a deferred procedure ("Deferred Proc"), which will be explained below;

at the stage of FIG. 7, the procedure IF1 and the list L1 have been deleted, in response to one (and only one) actuation of the deletion means 8B.

Moreover, according to the invention, the monitoring unit 2 automatically determines, and the display means 4 present (also automatically) on the visual-display screen 6, for example in the window 7B, if appropriate, the new limitations which are generated by reason of the failure. These new limitations are presented continuously as soon as they are known (hence for all of the rest of the flight), as illustrated partially in FIG. 8 on which has simply been indicated the space ("LIMITATIONS") where these limitations will be noted, without giving an example thereof.

Furthermore, according to the invention, the monitoring device 1 further includes a selection means 8C capable of being actuated by an operator and allowing the latter, in a conditional failure-handling procedure which includes, in the usual way, a plurality of conditions, to select one of the conditions, and the display means 4 present, on the visual-display screen 6, the various possible conditions, and, as appropriate, the corresponding actions, and highlight, on the visual-display screen 6, after the selection of a particular condition by the selection means 8C, the actions to be carried out for this condition. To that end, they may cause only the actions to be carried out to appear, or may differentiate (for example, via a set of colors) the actions to be carried out from those to be ignored.

Consequently, by virtue of the invention, it is sufficient for the operator to select the appropriate condition, and the display means 4 present him with the actions having to be carried out for the condition thus selected. The function of help with the handling of the failure is therefore enhanced by the present invention.

Moreover, the monitoring device 1 includes a cancellation means 8J making it possible to cancel the selection of a condition, which the operator has just made, in a conditional failure-handling procedure. To implement this cancellation function, which can be called "UNDO", for example, the operator may have available a box to be ticked in front of each row of the screen corresponding to an (IF ( . . . )) condition. He selects a condition by clicking in a box. The latter is then enabled and a symbol, such as "✓", is displayed within this box. To implement the "UNDO" function, the pilot clicks on the enabled box containing the symbol "✓". The latter is then disabled and the displaying of the symbol is deleted. The corresponding condition is then no longer selected.

It is also possible to provide a recall means 8K which can be called "RECALL", for example, capable of being actuated by the operator and allowing the latter:

by a first actuation, to recall to the visual-display screen 6 the last procedure deleted, if appropriate; and by a second actuation, to recall to the visual-display screen 6 all the procedures deleted since the start of the flight of the aircraft, if appropriate.

The monitoring device 1 in accordance with the invention moreover includes:

an information means 8D specified below, capable of being actuated by the operator and allowing the latter to inform the monitoring device 1 of the occurrence of a failure or of an incident, which cannot be detected by the monitoring means C1 to Cn, but, on the other hand, by the crew, such as the cracking of the windscreen or the presence of a bomb on board the aircraft, for example; and an interrogation means 8E capable of being actuated by the operator and allowing the latter to ask the monitoring device 1 for the display means 4 to present the failure-handling procedure relating to this failure or this incident, on the visual-display screen 6.

The information means 8D is preferably formed in such a way as to allow manual input of the failure or of the incident by a menu.

Moreover, according to the invention, the monitoring device 1 takes account of all the failures, even those indicated manually by the operator, when it draws up the operational status report on the aircraft and when it calculates the new limitations.

For reasons of safety, a validation means 8F can be provided, necessitating manual validation on the part of the operator of the failure information which he has entered into the central unit 3 via the information means 8D.

In the context of the present invention, this validation means 8F or a similar validation means may also be designed to oblige the operator to carry out the validation of all the information which he has input into the monitoring device 1 or at least some of it, this information not then being taken into account by the monitoring device 1 unless it has actually been validated by the operator.

The monitoring device 1 in accordance with the invention moreover includes an interrogation means 8G, for example the "MORE" key of the keyboard 9 of FIG. 2, capable of being actuated by the operator and allowing the latter to request additional information relating to a failure. The display means 4, in response to such an actuation of the interrogation means 8G, then present, on the visual-display screen 6, for example in a particular region of the window 7B having the header "More Info", as represented in FIG. 8, additional information relating to the failure, and in particular information on the failure, on what has happened and/or on the limitations generated by this failure.

As indicated above with reference to FIG. 6, the display means 4 may, by information, on the visual-display screen 6, present a deferred procedure IF4 ("Deferred Proc") including actions having to be carried out subsequently, for example during the approach ("APP": Approach") or the landing ("LDG": "Landing"). These actions are presented (for example, in gray) so that the operator knows that they are not to be carried out for the moment.

However, the monitoring device 1 includes a particular validation means 8H, which is capable of being actuated by the operator and which allows the latter to validate these deferred actions (which may, for example, change color (blue) when they are validated), so as to carry them out immediately upon the validation.

This makes it possible to carry out the deferred actions (in cooperation with the monitoring device 1) at any moment in the event of necessity, for example when a failure occurs during the approach.

The monitoring device 1 may, moreover, include a recall means 8L which makes it possible to recall all the deferred actions which have been deleted from the screen 6 by the crew members (for clarity of the display) and which have not yet been carried out.

In one particular embodiment, the monitoring device 1 in accordance with the invention further includes a database 14 represented in FIG. 1 and including lists of operations to be verified or checked (of the "check lists" type) which are capable of being displayed by the display means 4.

This relates to lists of operations to be verified which are generally drawn up on the basis of recommendations made by the constructor of the airplane, and which are adapted to the specific wishes of the airlines. These lists are usually found on a paper medium, and their presentation in accordance with the invention on the visual-display screen 6 makes it possible to facilitate reading them and making use of them.

These lists may be called up according to two different modes:

either manually by an actuation means 8I capable of being actuated by an operator;

or automatically, especially on the basis of the phase of flight, by means 15 which are incorporated into the device 1. Hence, when, after a defined duration in one phase of flight (for example during the approach), in which validations have to be carried out, the operator has not (manually) called up the corresponding list, the means 15 automatically order them to be presented on the screen 6.

The monitoring device 1 in accordance with the invention further includes means 16 which are linked by a link 17 to the database 14 and which are intended automatically to correct the lists ("check lists") upon a failure, so as to take account of the effects generated by this failure on these lists.

What is claimed is:

1. A device for monitoring a plurality of systems of an aircraft, comprising:

a monitoring unit configured to monitor the systems and to detect a failure of at least one of the systems;

a display configured to display information output by the monitoring unit including at least one failure condition including a list of tasks to perform to address a detected failure including tasks already performed and tasks to be performed; and an input device configured to input information indicating that a task has been completed, wherein the monitoring unit includes a deletion mechanism configured to delete the at least one failure condition, and includes a recall mechanism configured to recall a previously deleted failure condition or to recall all previously deleted failure conditions.

2. The device according to claim 1, further comprising:

a highlighter configured to highlight a next task to be performed.

3. The device according to claim 1, wherein the display displays at least one indicator indicating that all of the tasks in the list of tasks have been performed.

4. The device according to claim 1, wherein the display displays a block diagram of a system corresponding to the detected failure.

5. The device according to claim 4, wherein the display highlights a component of the system corresponding to the detected failure.

6. The device according to claim 1, wherein the monitoring unit includes a selection mechanism configured to select at least one of said at least one failure condition, and wherein the display displays the list of tasks corresponding to the selected failure condition.

7. The device according to claim 6, wherein the monitoring unit includes an undo mechanism configured to undo the selected failure condition, and wherein the monitoring unit includes a recall mechanism configured to recall the undone failure condition.

8. The device according to claim 1, wherein the monitoring unit includes an informing mechanism configured to manually inform the monitoring unit about a failure that occurred and that was not detected by the monitoring unit, and includes an interrogation mechanism configured to instruct the display to display a list of tasks corresponding to the failure that occurred and that was not detected by the monitoring unit.

9. The device according to claim 1, wherein the monitoring unit includes a selection mechanism configured to request additional information corresponding to the at least one failure condition, and the display displays the additional information when the selection mechanism is selected.

10. The device according to claim 1, wherein the monitoring unit generates deferred procedures to be performed, and the display displays the deferred procedures.

11. A device for monitoring a plurality of systems of an aircraft, comprising:

means for monitoring the systems and to detect a failure of at least one of the systems;

means for displaying information output by the monitoring means including at least one failure condition including a list of tasks to perform to address a detected failure including tasks already performed and tasks to be performed; and means for inputting information indicating that a task has been completed, wherein the monitoring means includes a means for deleting the at least one failure condition, and includes a means for recalling a previously deleted failure condition or for recalling all previously deleted failure conditions.

12. The device according to claim 11, further comprising:

means for highlighting a next task to be performed.

13. The device according to claim 11, wherein the display means displays at least one means for indicating that all of the tasks in the list of tasks have been performed.

14. The device according to claim 11, wherein the display means displays a block diagram of a system corresponding to the detected failure.

15. The device according to claim 14, wherein the display means highlights a component of the system corresponding to the detected failure.

16. The device according to claim 11, wherein the monitoring means includes a means for selecting at least one of said at least one failure condition, and wherein the display means displays the list of tasks corresponding to the selected failure condition.

17. The device according to claim 16, wherein the monitoring means includes a means for undoing the selected failure condition, and wherein the monitoring means includes a means for recalling the undone failure condition.

18. The device according to claim 11, wherein the monitoring means includes a means for manually informing the monitoring means about a failure that occurred and that was not detected by the monitoring means, and includes a means for instructing the display means to display a list of tasks corresponding to the failure that occurred and that was not detected by the monitoring means.

19. The device according to claim 11, wherein the monitoring means includes a means for requesting additional information corresponding to the at least one failure condition, and the display means displays the additional information when the additional information is requested.

20. The device according to claim 11, wherein the monitoring means generates deferred procedures to be performed, and the display means displays the deferred procedures.

21. A device for monitoring a plurality of systems of an aircraft, comprising:

a monitoring unit configured to monitor the systems and to detect a failure of at least one of the systems;

a display configured to display information output by the monitoring unit including at least one failure condition including a list of tasks to perform to address a detected failure including tasks already performed and tasks to be performed; and an input device configured to input information indicating that a task has been completed, wherein the monitoring unit includes a selection mechanism configured to select at least one of said at least one failure condition, an undo mechanism configured to undo the selected failure condition, and a recall mechanism configured to recall the undone failure condition.

22. The device of claim 21, wherein the display displays the list of tasks corresponding to the selected failure condition.

23. A device for monitoring a plurality of systems of an aircraft, comprising:

means for monitoring the systems and to detect a failure of at least one of the systems;

means for displaying information output by the monitoring means including at least one failure condition including a list of tasks to perform to address a detected failure including tasks already performed and tasks to be performed; and means for inputting information indicating that a task has been completed, wherein the monitoring means includes a means for selecting at least one of said at least one failure condition, the monitoring means includes a means for undoing the selected failure condition, and the monitoring means includes a means for recalling the undone failure condition.

24. The device of claim 23, wherein the means for displaying displays the list of tasks corresponding to the selected failure condition.

* * * * *